United States Patent
Inoue et al.

(10) Patent No.: US 7,830,609 B2
(45) Date of Patent: Nov. 9, 2010

(54) LASER LIGHT BEAM COUPLING APPARATUS

(75) Inventors: Yoko Inoue, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/230,665

(22) Filed: Sep. 3, 2008

(65) Prior Publication Data

US 2009/0122416 A1    May 14, 2009

(30) Foreign Application Priority Data

Sep. 4, 2007    (JP)  ............... 2007-229277

(51) Int. Cl.
*G02B 27/30* (2006.01)
*G02B 13/18* (2006.01)
(52) U.S. Cl. .................. 359/641; 359/719
(58) Field of Classification Search ............ 359/641
See application file for complete search history.

(56) References Cited

U.S. PATENT DOCUMENTS 6,718,088 B2 * 4/2004 Okazaki et al. ............ 385/27

2006/0274434 A1 * 12/2006 Mino et al. ............ 359/811
2007/0237455 A1 * 10/2007 Sonoda et al. ............ 385/33
2008/0173392 A1 * 7/2008 Tanaka et al. ............ 156/272.8

FOREIGN PATENT DOCUMENTS

| JP | 2002-202442 A | 7/2002 |
| JP | 2004-77779 A | 3/2004 |
| JP | 2005-114977 A | 4/2005 |

* cited by examiner

*Primary Examiner*—Ricky L Mack
*Assistant Examiner*—James C Jones
(74) *Attorney, Agent, or Firm*—Birch, Stewart, Kolasch & Birch, LLP

(57) ABSTRACT

Plural collimator lenses are arranged corresponding to plural laser light sources to collimate light beams emitted from the laser light sources into substantially parallel light beams, respectively. A condenser lens focuses the substantially parallel light beams. A coupling optical element, on which light beams focused by the condenser lens are incident, couples the light beams into a single light beam. The laser light sources are arranged such that a longitudinal direction of an emitting region of each of the laser light sources is coincident with a radial direction of the condenser lens.

14 Claims, 6 Drawing Sheets

LASER LIGHT BEAM COUPLING APPARATUS

BACKGROUND OF THE INVENTION

1. Field of the Invention

The present invention relates to a laser light beam coupling apparatus that couples a plurality of laser beams emitted from a plurality of light sources into a single light beam.

2. Description of the Related Art

In recent years, the technology of coupling a plurality of laser light beams emitted from a plurality of light sources into a single light beam is being developed to obtain a high-power laser light. For example, Japanese Patent Application Laid-open No. 2002-202442 discloses a laser light beam coupling apparatus that includes a plurality of light sources arranged in a matrix shape, a plurality of collimator lenses arranged corresponding to the light sources, a condenser lens, and a multimode optical fiber. Each of the collimator lenses collimates a light beam emitted from its corresponding light source into a substantially parallel light beam and outputs the substantially parallel light beam to the condenser lens. The condenser lens then focuses the substantially parallel light beams on the multimode optical fiber to obtain a single light beam.

Japanese Patent Application Laid-open No. 2005-114977 discloses a laser light beam coupling apparatus that takes into consideration the anisotropy in the emitting angle of the light beam. The laser light beam coupling apparatus includes an array of semiconductor lasers each having an emitting region with identical orientation. The semiconductor lasers having relatively larger emitting regions are arranged in vertical direction, while the semiconductor lasers having relatively smaller emitting regions are arranged in horizontal direction. Moreover, the number of semiconductor lasers having relatively larger emitting regions is less than the semiconductor lasers having relatively smaller emitting regions. An anamorphic element is used to adjust the size of the light beams emitted from the semiconductor lasers. As a result, when the light beams are coupled into a single light beam, the beam spot diameter of the single light beam is reduced in a balanced manner.

Meanwhile, during the process of manufacturing a semiconductor laser, the size of its emitting region in the width direction generally becomes several times larger than that in the thickness direction. The emitting angle of the light beam emitted from the semiconductor laser depends on the size of the emitting region. In the thickness direction of the semiconductor laser (i.e., in the short side direction of the emitting region), the light beam emits from substantially a single point source and diverges by a relatively larger angle. On the other hand, in the width direction of the semiconductor laser (i.e., in the long side direction of the emitting region), the light beam emits from the entire width portion and diverges by a relatively smaller angle. Thus, the emitted light beam has an anisotropic emitting angle with respect to the thickness direction and the width direction of the emitting region. The shape of the beam spot obtained by focusing such an emitted light beam is elliptical. The long axis direction of the elliptical beam spot corresponds to the width direction of the emitting region, while the short axis direction of the elliptical beam spot corresponds to the thickness direction of the emitting region.

Thus, if a plurality of semiconductor lasers, each emitting a light beam at an anisotropic emitting angle, is arranged in a matrix shape, then the coupled beam spot of those light beams happens to possess anisotropy as the beam characteristic. As a result, the beam spot diameter of the single light beam increases in a single direction thereby degrading the coupling efficiency with the multimode optical fiber.

An example of an anamorphic element is a prism, which is high-priced thereby increasing the manufacturing cost of the laser light beam coupling apparatus. Moreover, use of the anamorphic element leads to optical loss such as internal absorption or interface reflection. Thus, it becomes difficult to perform efficient light coupling at low manufacturing cost by using the anamorphic element.

SUMMARY OF THE INVENTION

It is an object of the present invention to at least partially solve the problems in the conventional technology.

According to one aspect of the present invention, there is provided a laser light beam coupling apparatus including a plurality of laser light sources each emitting a light beam at an anisotropic emitting angle; a plurality of collimator lenses corresponding to the laser light sources to collimate light beams emitted from the laser light sources into substantially parallel light beams, respectively; a condenser lens that focuses the substantially parallel light beams; and a coupling optical element on which light beams focused by the condenser lens are incident, the coupling optical element coupling the light beams into a single light beam. The laser light sources are arranged such that a longitudinal direction of an emitting region of each of the laser light sources is coincident with a radial direction of the condenser lens.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
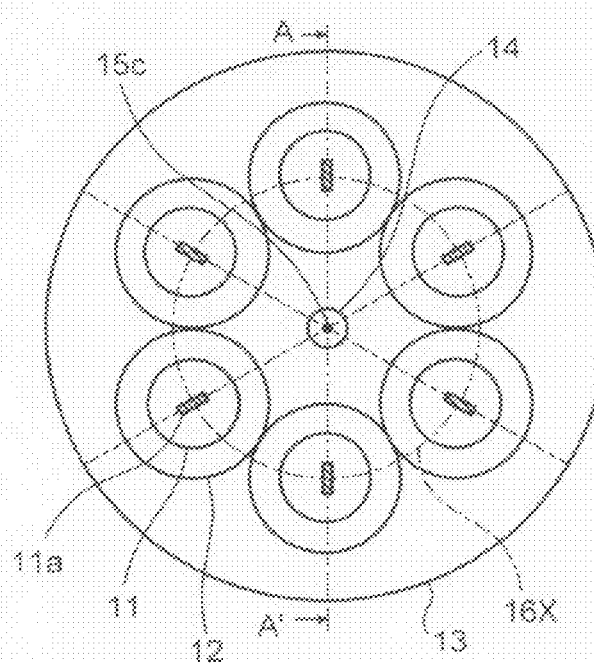
FIG. 1 is a top view of a laser light beam coupling apparatus according to a first embodiment of the present invention.
Figure 2:
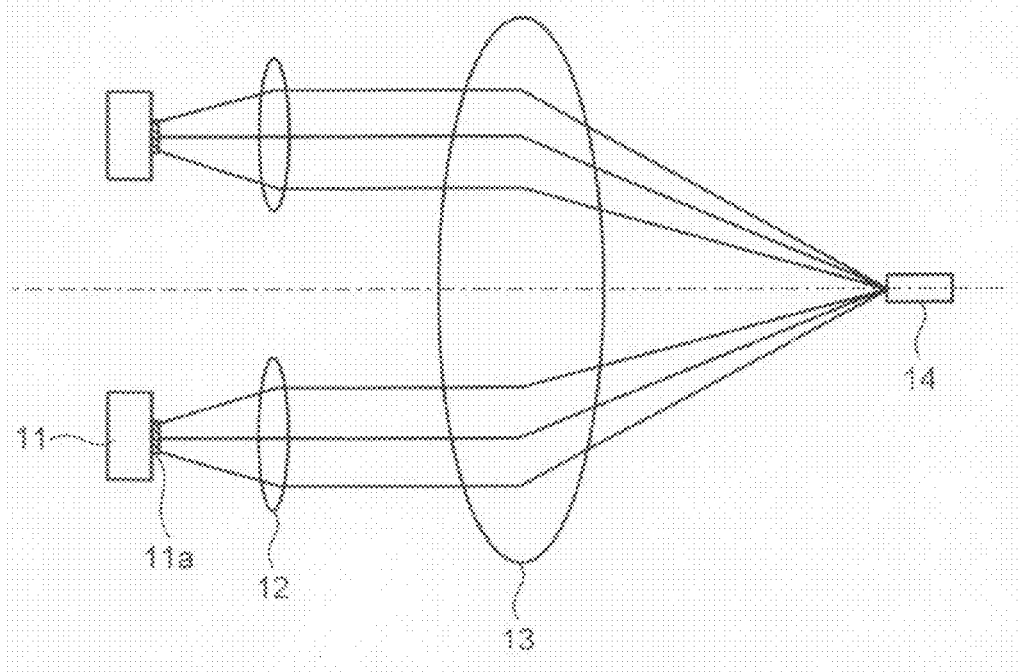
FIG. 2 is a cross-sectional view of the laser light beam coupling apparatus.

FIG. 1 is a top view of a laser light beam coupling apparatus 101 according to a first embodiment of the present invention viewed along an optical axis 15c. FIG. 2 is a cross-sectional view of the laser light beam coupling apparatus 101 along an A-A' line, which is drawn perpendicular to the optical axis 15c.

The laser light beam coupling apparatus 101 includes six semiconductor laser light sources 11, six collimator lenses 12, a condenser lens 13, and a coupling optical element 14 such as a multimode optical fiber. In the laser light beam coupling apparatus 101, light beams emitted from the semiconductor laser light sources 11 are focused on the coupling optical element 14 to obtain a single light beam. Each semiconductor laser light source 11 includes an emitting region 11a from which a light beam is emitted. The orientation of each emitting region 11a is such that the longitudinal direction thereof is along the radial direction of the condenser lens 13.

Each collimator lens 12 is arranged corresponding to one semiconductor laser light source 11. The light beam emitted from each semiconductor laser light source 11 passes through the corresponding collimator lens 12 and substantially falls on the condenser lens 13. The condenser lens 13 then focuses the light beams on the coupling optical element 14.

Each semiconductor laser light source 11 emits a light beam at an anisotropic emitting angle with respect to the thickness direction and the width direction of the corresponding emitting region 11a. Each semiconductor laser light source 11 can be configured to have, although not limited to, the emitting region 11a of about 10 micrometers in the horizontal direction and about 1 micrometer in the vertical direction, and the emitting angle (full width at half maximum) of about 8° in the horizontal direction and about 30° in the vertical direction.

The semiconductor laser light sources 11 are arranged in a circular pattern 16X, which is a concentric circle shown by a dashed-dotted line in FIG. 1. Each semiconductor laser light source 11 makes an angle of about 60° with the neighboring semiconductor laser light sources 11. The center of the circular pattern 16X lies on the optical axis 15c. The optical axis 15c passes through the center of the condenser lens 13. The width direction of the emitting region 11a of each semiconductor laser light source 11 is substantially oriented along the radial direction of the circular pattern 16X.

As described above, one collimator lens 12 is arranged corresponding to each semiconductor laser light source 11. When viewed along the optical axis 15c, the focal position of each collimator lens 12 exactly or substantially matches with the center of the emitting region 11a of the corresponding semiconductor laser light source 11. Each collimator lens 12 collimates the divergent light beam emitted from the corresponding semiconductor laser light source 11 into a substantial parallel light beam having a high degree of parallelization. Each collimator lens 12 can be fabricated by using, although not limited to, an aspheric lens.

To reduce the area covered by the circular pattern 16X in which the six semiconductor laser light sources 11 are arranged, each collimator lens 12 can be configured to have, although not limited to, a relatively shorter focal length of about 6 millimeters and a diameter of about 10 millimeters.

The condenser lens 13 is arranged such that the focal point thereof is on an incident surface of the coupling optical element 14. Upon receiving the substantially parallel light beam output from each collimator lens 12, the condenser lens 13 focuses all of the substantially parallel light beams on the incident surface of the coupling optical element 14. For that, the condenser lens 13 needs to have a larger lens surface than the combined occupied area of the six collimator lenses 12. For example, corresponding to the collimator lenses 12 each having diameter of about 10 millimeters, the condenser lens 13 can be fabricated to have a diameter of about 35 millimeters and a focal length of about 85 millimeters.

The coupling optical element 14 internally couples light beams incident on the incident surface thereof and has a numerical aperture of, although not limited to 0.2. Thus, by using the coupling optical element 14, the light beams emitted from the six semiconductor laser light sources 11 are coupled into a single light beam.

Figure 3:
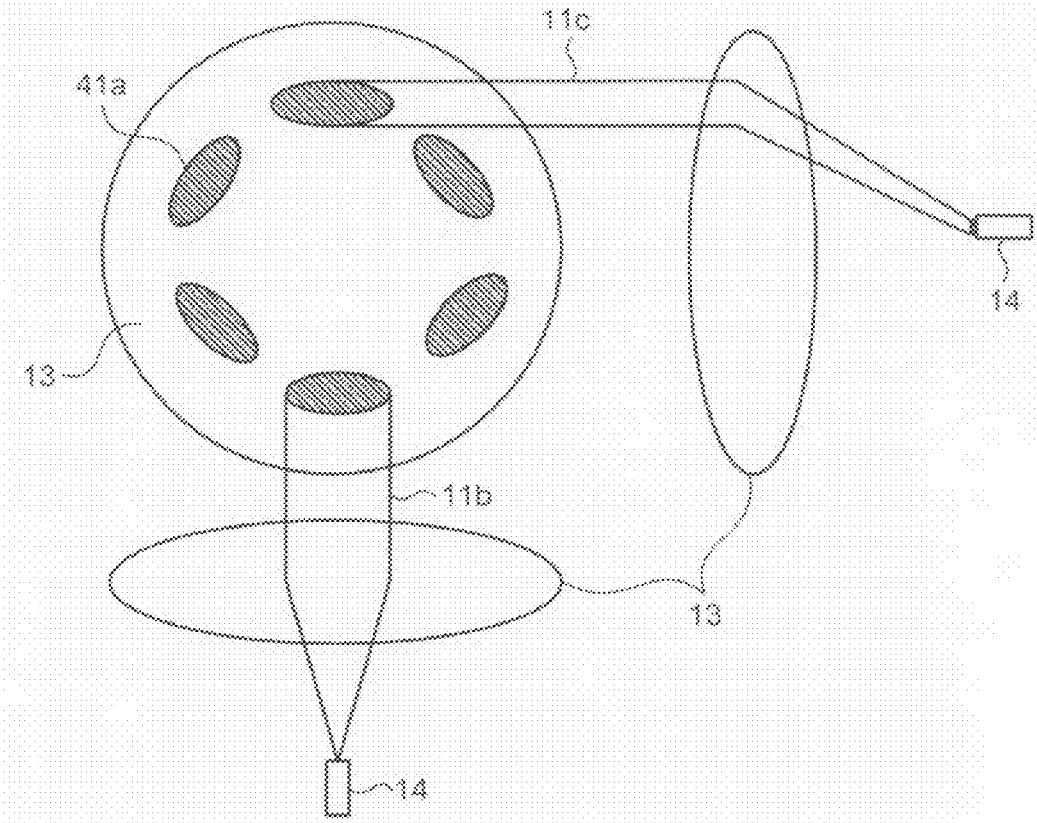
FIG. 3 is a diagram for explaining the manner in which light beams incident on a condenser lens are focused on a coupling optical element to obtain a single light beam in the laser light beam coupling apparatus.

FIG. 3 is a diagram for explaining the manner in which light beams incident on the condenser lens 13 are focused on the coupling optical element 14 to obtain a single light beam. The orientation (i.e., the longitudinal direction and the short side direction) of each light beam incident on the condenser lens 13 is reversed from the orientation of the emitting region 11a. That happens because of the anisotropy in the emitting angle of each light beam.

At the time of light emission by each semiconductor laser light source 11, the light confined in an active layer thereof diverges in the perpendicular direction to the active layer (e.g., in the direction of a light beam 11c in FIG. 3). Thus, the amount of divergence is larger in the perpendicular direction to the active layer (i.e., in the thickness direction of the semiconductor laser light source 11) than in the parallel direction to the active layer (i.e., in the width direction of the semiconductor laser light source 11). In other words, the emitted light beam diverges at a relatively larger angle with respect to the width direction of the semiconductor laser light source 11 (i.e., the short side direction of the emitting region 11a) and diverges at a relatively smaller angle with respect to the width direction of the semiconductor laser light source 11 (i.e., the longitudinal direction of the emitting region 11a). Consequently, when the semiconductor laser light source 11 having an emitting angle of about 8° in the horizontal direction and about 30° in the vertical direction emits a light beam, the shape of that light beam on the condenser lens 13 is substantially elliptical. The longitudinal direction of the elliptical light beam corresponds to the short side direction of the emitting region 11a, while the short side direction of the elliptical light beam corresponds to the longitudinal direction of the emitting region 11a.

In each semiconductor laser light source 11, emission of a laser beam in the thickness direction of the corresponding emitting region 11a occurs at almost the diffraction limit. Consequently, upon passing through the collimator lens 12, a substantially parallel light beam 11b having a high degree of parallelization is obtained. That results in a relatively smaller diameter of the beam spot on the condenser lens 13. On the other hand, a laser beam emitted in the width direction of the corresponding emitting region 11a is reflective of the width of that emitting region 11a. Moreover, upon passing through the collimator lens 12, the substantially parallel light beam 11c happens to have a certain emitting angle. That results in a relatively larger diameter of the beam spot on the condenser lens 13.

Figure 4:
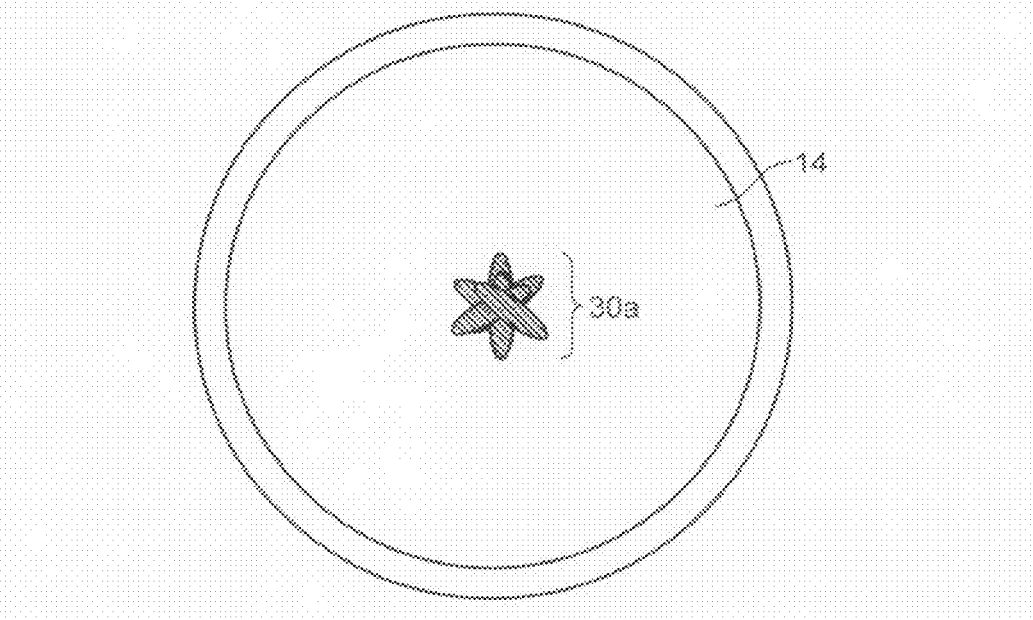
FIG. 4 is a diagram of a coupled beam spot formed in the coupling optical element.

As described above, the substantially parallel light beam output from each collimator lens 12 falls on the condenser lens 13 and is focused on the incident surface of the coupling optical element 14. In that case, the beam spot corresponding to each substantially parallel light beam is superimposed on the incident surface of the coupling optical element 14, which results in the formation of a coupled beam spot. More particularly, as shown in FIG. 4, the beam spot center of each substantially parallel light beam is superimposed at the substantially central portion of the incident surface of the coupling optical element 14 such that a coupled beam spot 30*a* is obtained.

Figure 5:
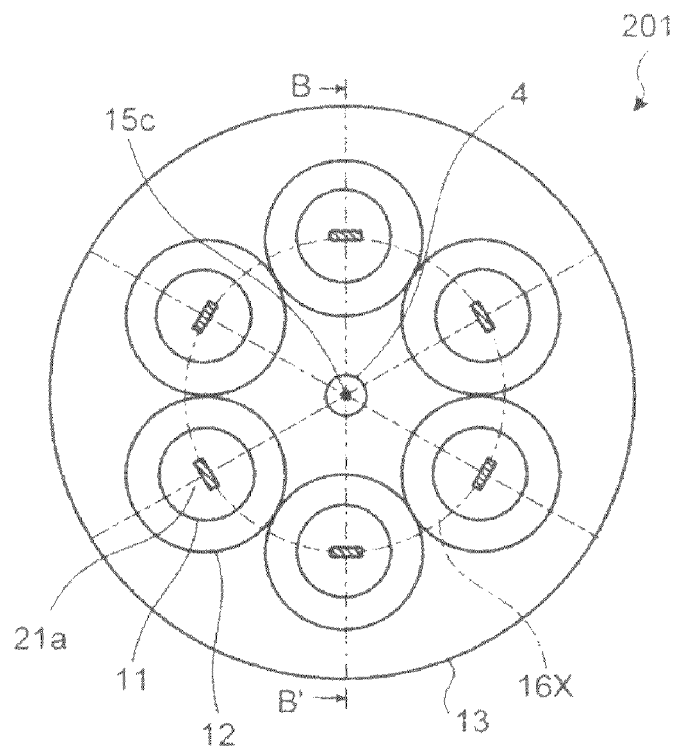
FIG. 5 is a top view of a laser light beam coupling apparatus having a different configuration.
Figure 6:
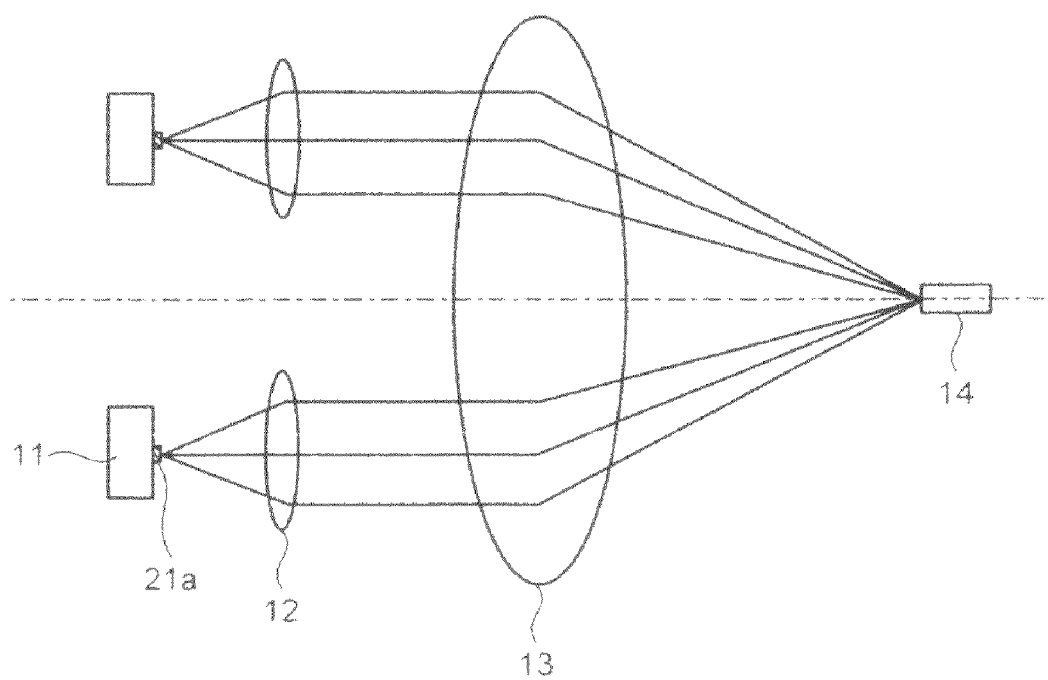
FIG. 6 is a cross-sectional view of the laser light beam coupling apparatus shown in FIG. 5.

Described below are the advantages of the laser light beam coupling apparatus 101 as compared to a laser light beam coupling apparatus 201 in which the semiconductor laser light sources 11 are arranged in a different manner. FIG. 5 is a top view of the laser light beam coupling apparatus 201 viewed along the optical axis 15*c*. FIG. 6 is a cross-sectional view of the laser light beam coupling apparatus 201 along a B-B' line, which is drawn perpendicular to the optical axis 15*c*. Meanwhile, the identical constituent elements of the laser light beam coupling apparatuses 101 and 201 are referred to by identical reference numerals and their description is not repeated.

In the case of the laser light beam coupling apparatus 101, the width direction of the emitting region 11*a* of each semiconductor laser light source 11 is substantially oriented along the radial direction of the circular pattern 16X. On the other hand, in the case of the laser light beam coupling apparatus 201, the thickness direction of the emitting region 11*a* of each semiconductor laser light source 11 is substantially oriented along the radial direction of the circular pattern 16X (see FIG. 5).

Figure 7:
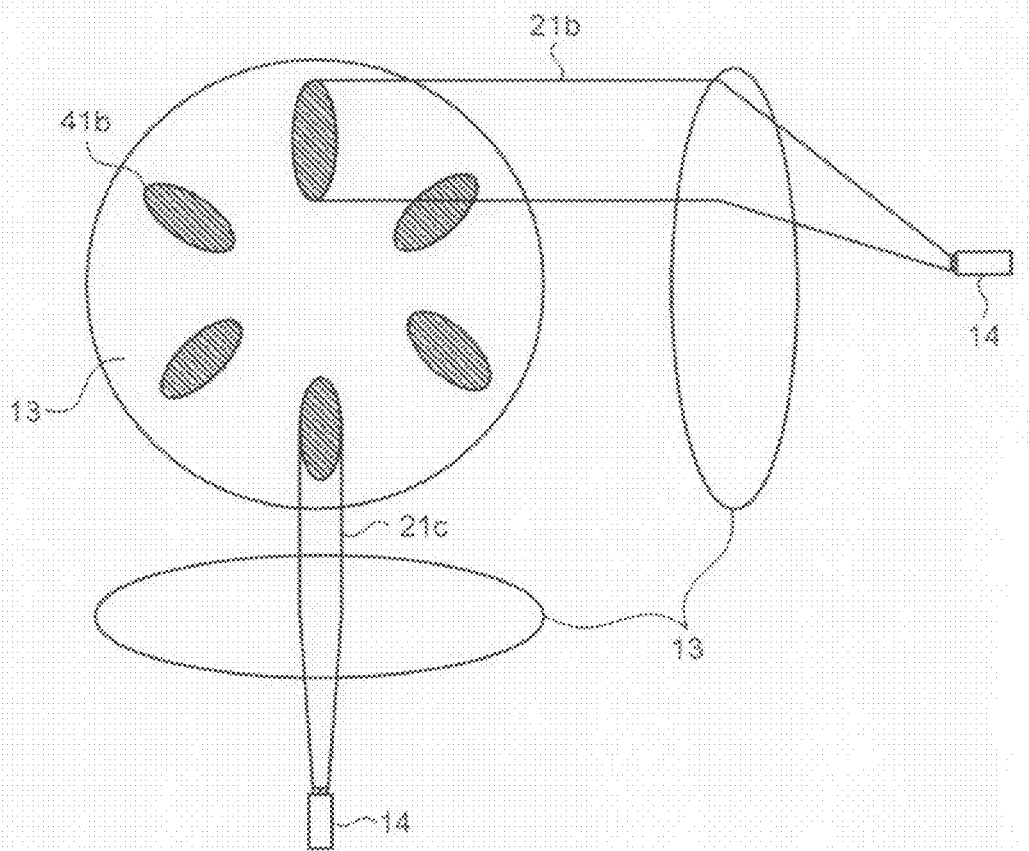
FIG. 7 is a diagram for explaining the manner in which light beams incident on a condenser lens are focused on a coupling optical element to obtain a single light beam in the laser light beam coupling apparatus shown in FIG. 5.

FIG. 7 is a diagram for explaining the manner in which light beams incident on the condenser lens 13 are focused on the coupling optical element 14 to obtain a single light beam in the laser light beam coupling apparatus 201. As shown in FIG. 7, the orientation (i.e., the longitudinal direction and the short side direction) of each light beam incident on the condenser lens 13 is reversed from the orientation of the emitting region 11*a*. That happens because of the anisotropy in the emitting angle of each light beam.

Figure 8:
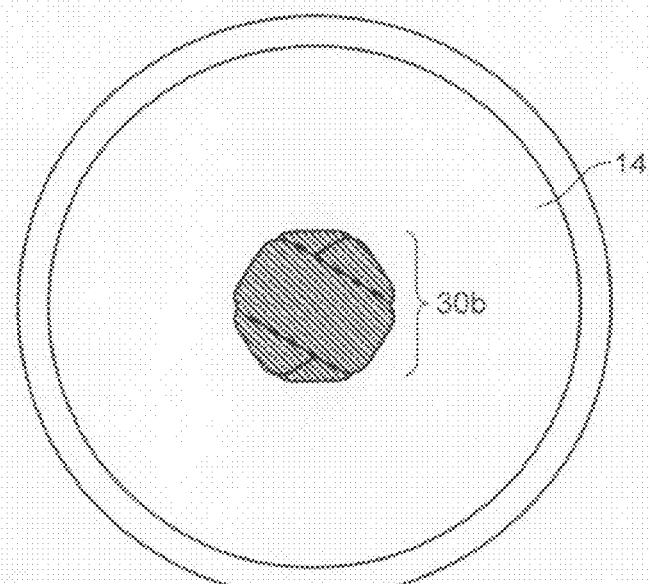
FIG. 8 is a diagram of a coupled beam spot formed in the coupling optical element shown in FIG. 5.

Irrespective of the laser light beam coupling apparatus 101 or the laser light beam coupling apparatus 201, emission of a laser beam in the thickness direction of the emitting region 11*a* of each semiconductor laser light source 11 occurs at almost the diffraction limit. That results in a relatively smaller diameter of the beam spot on the condenser lens 13. However, regarding the emission of a laser beam in the width direction of the emitting region 11*a*, it can be observed from FIGS. 3 and 7 that the optical axis height (i.e., size in the radial direction) of the light beam 11*c* incident on the condenser lens 13 in the laser light beam coupling apparatus 101 is about four times larger than the optical axis height of a light beam 21*b* incident on the condenser lens 13 in the laser light beam coupling apparatus 201. Thus, the maximum optical axis height of the light beam 21*b* in the laser light beam coupling apparatus 201 is larger than the maximum optical axis height of the light beam 11*c* in the laser light beam coupling apparatus 101. Herein, the maximum optical axis height of a light beam is the maximum distance between the center of the condenser lens 13 and the light beam. Because a beam spot diameter is proportional to the maximum optical axis height of a light beam, the beam spot diameter of a light beam in the laser light beam coupling apparatus 201 becomes larger than the beam spot diameter of a light beam in the laser light beam coupling apparatus 101. Moreover, because of the larger optical height, the laser light beam coupling apparatus 201 is affected by spherical aberration thereby causing an increase in the beam spot diameter of a light beam. Furthermore, because a laser beam emitted in the width direction of the corresponding emitting region 11*a* is reflective of the width of that emitting region 11*a*, the beam spots on the condenser lens 13 in the laser light beam coupling apparatus 201 have a substantially identical size as the beam spots on the condenser lens 13 in the laser light beam coupling apparatus 101. When the beam spots on the condenser lens 13 in the laser light beam coupling apparatus 201 are superimposed on the incident surface of the coupling optical element 14, a coupled beam spot 30*b* is obtained as shown in FIG. 8. By comparing FIGS. 4 and 8, it can be observed that the diameter of the coupled beam spot 30*b* is larger than the diameter of the coupled beam spot 30*a*. Thus, to sum up, by using the laser light beam coupling apparatus 101, it is possible to obtain a relatively smaller coupled beam spot as compared to the laser light beam coupling apparatus 201.

Figure 9:
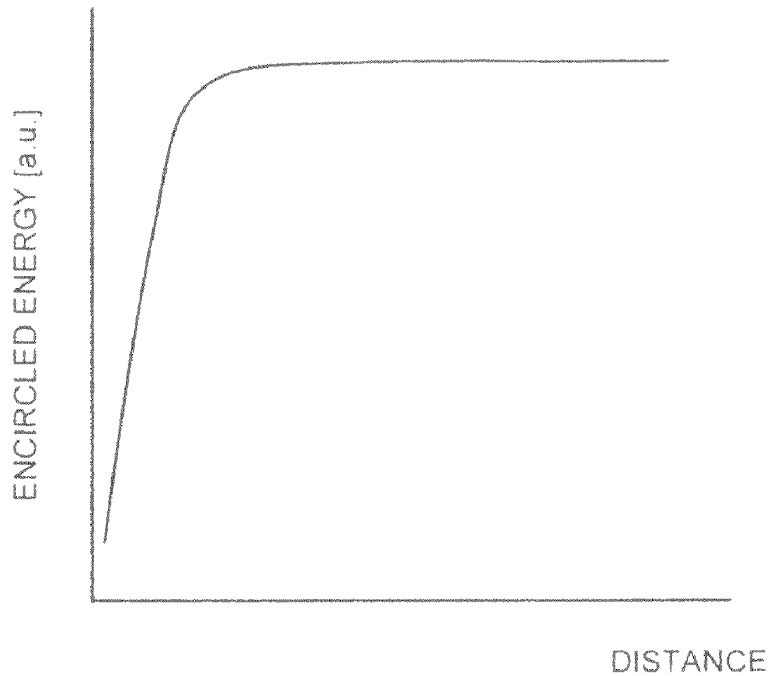
FIG. 9 is a graph for explaining a relation between the encircled energy at the coupled beam spot in the laser light beam coupling apparatus shown in FIG. 1.
Figure 10:
FIG. 10 is a graph for explaining a relation between the encircled energy at the coupled beam spot in the laser light beam coupling apparatus shown in FIG. 5.

Given below is the comparison of encircled energy at the coupled beam spot 30*a* and encircled energy at the coupled beam spot 30*b*. FIG. 9 is a graph for explaining a relation between the encircled energy at the coupled beam spot 30*a* and the distance from the center of the coupled beam spot 30*a*, while FIG. 10 is a graph for explaining a relation between the encircled energy at the coupled beam spot 30*b* and the distance from the center of the coupled beam spot 30*b*.

It can be observed from FIG. 9 that the light intensity is concentrated near the center of the coupled beam spot 30*a* and the diameter of the coupled beam spot 30*a* is relatively smaller. On the other hand, it can be observed from FIG. 10 that the light intensity is dispersive around the center of the coupled beam spot 30*b* and the diameter of the coupled beam spot 30*b* is relatively larger.

Thus, because of the relatively smaller diameter of the coupled beam spot 30*a*, it becomes possible to enhance the efficiency of electric-optic conversion thereby enabling efficient laser beam coupling. As a result, it becomes possible to manufacture a reliable and low-cost light source apparatus.

Meanwhile, instead of using a single multimode optical fiber as the coupling optical element 14, it is also possible to use an optical fiber bundle manufactured by bundling a plurality of multimode optical fibers or an optical integrator rod that can be either one of solid and hollow. Moreover, instead of using the semiconductor laser light sources 11, it is also possible to use solid-state lasers or surface-emitting lasers.

To sum up, by using the laser light beam coupling apparatus 101, it is possible to form a coupled beam spot having a relatively smaller diameter. That enables to reduce the size of the coupling optical element 14, and manufacture a reliable and low-cost light source apparatus. Moreover, because the light beams can be focused on the coupling optical element 14 with some tolerance, it is possible to obtain a tolerance resistant light source apparatus. Thus, the laser light beam coupling apparatus 101 having a simple configuration can be manufactured at low cost to efficiently couple the light beams. Furthermore, by arranging the semiconductor laser light sources 11 in the circular pattern 16X, it becomes possible to downsize the laser light beam coupling apparatus 101.

Figure 11:
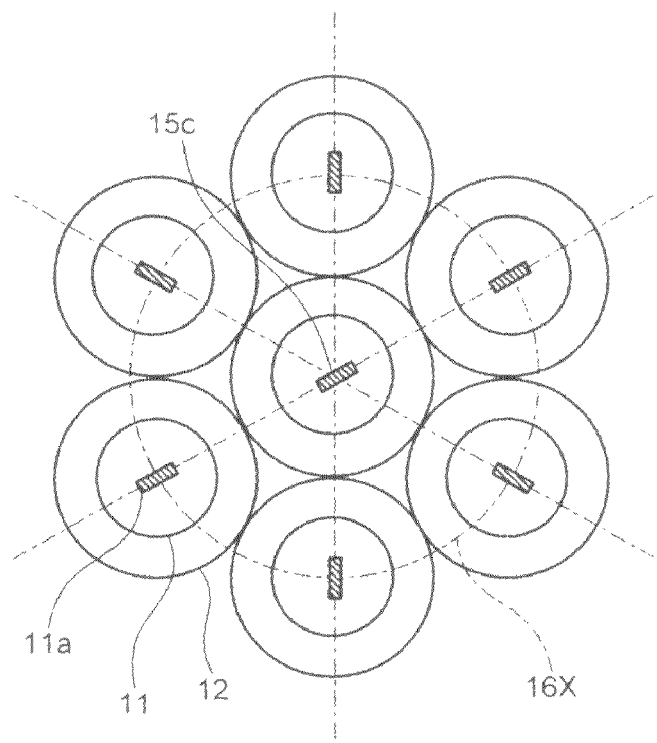
FIG. 11 is a top view of the laser light beam coupling apparatus according to a second embodiment of the present invention.

FIG. 11 is a top view of the laser light beam coupling apparatus 101 according to a second embodiment of the present invention viewed along the optical axis 15*c*. The identical constituent elements of the laser light beam coupling apparatus 101 according to the first embodiment and the second embodiment are referred to by identical reference numerals and their description is not repeated.

The laser light beam coupling apparatus 101 shown in FIG. 11 includes seven semiconductor laser light sources 11. More particularly, in addition to the six semiconductor laser light sources 11 arranged in the circular pattern 16X, a seventh semiconductor laser light source 11 is arranged inside the circular pattern 16X.

Each of the six semiconductor laser light sources 11 arranged in the circular pattern 16X makes the angle of about 60° with the neighboring semiconductor laser light sources 11. Moreover, the width direction of the emitting region 11a of each of the six semiconductor laser light sources 11 is substantially oriented along the radial direction of the circular pattern 16X. The seventh semiconductor laser light source 11 is arranged inside the circular pattern 16X such that the center thereof lies on the optical axis 15c. Meanwhile, the orientation of the emitting region 11a of the seventh semiconductor laser light source 11 is not limited to a particular direction.

When the seventh semiconductor laser light source 11 is arranged such that the center thereof lies on the optical axis 15c, it is possible to focus the light beam emitted therefrom in a beam spot having a relatively smaller diameter. Moreover, by arranging the six semiconductor laser light sources 11 such that the width direction of the corresponding emitting region 11a is substantially oriented along the radial direction of the circular pattern 16X, it is possible to reduce the overall diameter of the coupled beam spot. Thus, because of such a configuration, the laser light beam coupling apparatus 101 can be manufactured at low cost to efficiently couple the light beams.

FIG. 11 is a top view of the laser light beam coupling apparatus 101 according to a third embodiment of the present invention viewed along the optical axis 15c. The identical constituent elements of the laser light beam coupling apparatus 101 according to the first embodiment and the third embodiment are referred to by identical reference numerals and their description is not repeated.

Figure 12:
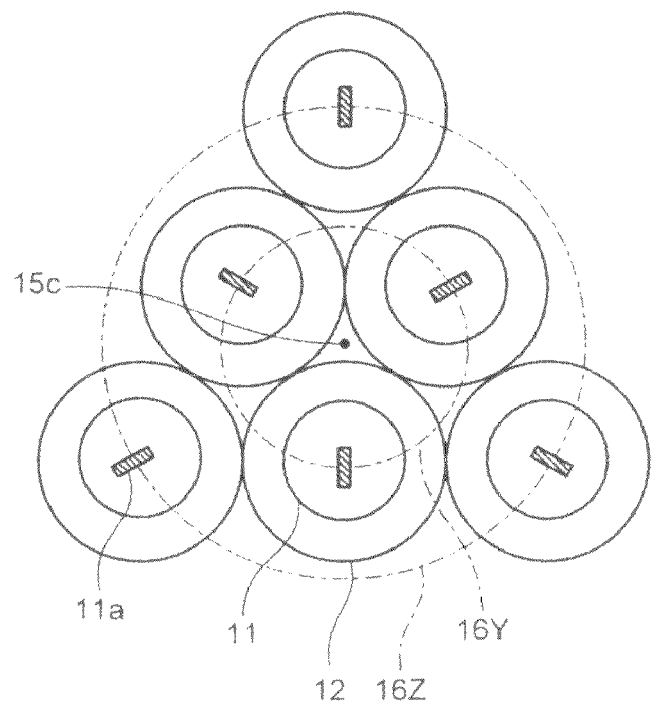
FIG. 12 is a top view of the laser light beam coupling apparatus according to a third embodiment of the present invention.

The laser light beam coupling apparatus 101 shown in FIG. 12 includes six semiconductor laser light sources 11. Three of the six semiconductor laser light sources 11 are arranged in an inner circular pattern (hereinafter, "inner light sources 11"), while the remaining three semiconductor laser light sources 11 are arranged in an outer circular pattern on the outside of the inner circular pattern (hereinafter, "outer light sources 11").

More particularly, the inner light sources 11 are arranged in an inner circular pattern 16Y around the optical axis 15c. Each inner light source 11 makes an angle of about 120° with the neighboring inner light sources 11. The center of the inner circular pattern 16Y lies on the optical axis 15c.

The outer light sources 11 are arranged in an outer circular pattern 16Z on the outside of the inner circular pattern 16Y. Each outer light source 11 makes the angle of about 120° with the neighboring outer light sources 11 and is arranged close to a pair of adjoining inner light sources 11. The center of the outer circular pattern 16Z also lies on the optical axis 15c. Thus, the centroid of an outer triangle formed by connecting the outer light sources 11 and the centroid of an inner triangle formed by connecting the inner light sources 11 overlap on the optical axis 15c. Moreover, the apex of the outer triangle and the apex of the inner triangle are out of alignment by about 60°. Meanwhile, each of the six semiconductor laser light sources 11 shown in FIG. 12 is arranged such that the width direction of the corresponding emitting region 11a is substantially oriented along the radial direction of the inner circular pattern 16Y and the outer circular pattern 16Z.

Such a configuration of the laser light beam coupling apparatus 101 enables to efficiently couple the light beams emitted from the semiconductor laser light sources 11.

In other words, even if the semiconductor laser light sources 11 are not arranged in a single circular pattern around the optical axis 15c, it is possible to efficiently couple the light beams when the width direction of each emitting region 11a is substantially oriented along the radial direction of the inner circular pattern 16Y and the outer circular pattern 16Z. Moreover, because the semiconductor laser light sources 11 are dividedly arranged in the inner circular pattern 16Y and the outer circular pattern 16Z, it is possible to downsize the laser light beam coupling apparatus 101.

Meanwhile, the number of semiconductor laser light sources and the arrangement thereof in a laser light beam coupling apparatus is not limited to the above-mentioned description. That is, as long as the width direction of the emitting region of a semiconductor laser light source is substantially oriented along the radial direction of the corresponding circular pattern, it is possible to arbitrarily arrange any number of semiconductor laser light sources.

According to one aspect of the present invention, orientation of an emitting region of each semiconductor laser light source is such that the longitudinal direction thereof is along the radial direction of a condenser lens. Because of such a configuration, a laser light beam coupling apparatus having a simple configuration can be manufactured at low cost to efficiently couple the light beams emitted from the semiconductor laser light sources.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A laser light beam coupling apparatus comprising:
   a plurality of laser light sources each emitting a light beam at an anisotropic emitting angle;
   a plurality of collimator lenses corresponding to the laser light sources to collimate light beams emitted from the laser light sources into substantially parallel light beams, respectively;
   a condenser lens on which the substantially parallel light beams are directly incident, wherein the condenser lens focuses the substantially parallel light beams; and
   a coupling optical element on which light beams focused by the condenser lens are directly incident, the coupling optical element coupling the light beams into a single light beam, wherein
   the laser light sources are arranged such that a longitudinal direction of an emitting region of each of the laser light sources is coincident with a radial direction of the condenser lens.

2. The laser light beam coupling apparatus according to claim 1, wherein the laser light sources are arranged on a concentric circle centering around a center axis of the condenser lens.

3. The laser light beam coupling apparatus according to claim 2, wherein the laser light sources are arranged on the concentric circle and inside an area covered by the concentric circle.

4. The laser light beam coupling apparatus according to claim 1, wherein the laser light sources are arranged on a first concentric circle centering around a center axis of the condenser lens and on a second concentric circle that is different from the first concentric circle.

5. The laser light beam coupling apparatus according to claim 1, wherein the laser light sources are arranged such that an amount of divergence of emitted light from each light source is larger in a thickness direction than in the width direction of the light source.

6. The laser light beam coupling apparatus according to claim 1, wherein the condenser lens is arranged such that a beam spot corresponding to each substantially parallel light beam is superimposed on an incident surface of the coupling element.

7. A laser light beam coupling apparatus comprising:
a plurality of laser light sources each emitting a light beam at an anisotropic emitting angle;
a plurality of collimator lenses corresponding to the laser light sources to collimate light beams emitted from the laser light sources into substantially parallel light beams, respectively;
a condenser lens on which the substantially parallel light beams are directly incident, wherein the condenser lens focuses the substantially parallel light beams; and
a coupling optical element on which light beams focused by the condenser lens are directly incident, the coupling optical element coupling the light beams into a single light beam, wherein
the laser light sources are arranged such that a thickness direction of an emitting region of each of the laser light sources is coincident with a radial direction of the condenser lens.

8. The laser light beam coupling apparatus according to claim 7, wherein the laser light sources are arranged on a concentric circle centering around a center axis of the condenser lens.

9. The laser light beam coupling apparatus according to claim 8, wherein the laser light sources are arranged on the concentric circle and inside an area covered by the concentric circle.

10. The laser light beam coupling apparatus according to claim 7, wherein the laser light sources are arranged on a first concentric circle centering around a center axis of the condenser lens and on a second concentric circle that is different from the first concentric circle.

11. The laser light beam coupling apparatus according to claim 7, wherein the condenser lens is arranged such that a beam spot corresponding to each substantially parallel light beam is superimposed on an incident surface of the coupling element.

12. A laser light beam coupling apparatus comprising:
a plurality of laser light sources each emitting a light beam at an anisotropic emitting angle;
a plurality of collimator lenses corresponding to the laser light sources to collimate light beams emitted from the laser light sources into substantially parallel light beams, respectively;
a condenser lens that focuses the substantially parallel light beams; and
a coupling optical element on which light beams focused by the condenser lens are incident, the coupling optical element coupling the light beams into a single light beam, wherein
the laser light sources are arranged such that a longitudinal direction of an emitting region of each of the laser light sources is coincident with a radial direction of the condenser lens, and
wherein the laser light sources are arranged on a first concentric circle centering around a center axis of the condenser lens and on a second concentric circle that is different from the first concentric circle.

13. The laser light beam coupling apparatus according to claim 12, wherein the laser light sources are arranged such that an amount of divergence of emitted light from each light source is larger in a thickness direction than in the width direction of the light source.

14. The laser light beam coupling apparatus according to claim 12, wherein the condenser lens is arranged such that a beam spot corresponding to each substantially parallel light beam is superimposed on an incident surface of the coupling element.

* * * * *